United States Patent [19]

Katayama

[11] Patent Number: 4,743,811
[45] Date of Patent: May 10, 1988

[54] ADAPTIVE CONTROL SYSTEM FOR REEL TO REEL WEB TRANSPORT APPARATUS

[75] Inventor: Andrew S. Katayama, San Diego, Calif.

[73] Assignee: Eastman Kodak Company, Rochester, N.Y.

[21] Appl. No.: 98,647

[22] Filed: Sep. 21, 1987

[51] Int. Cl.⁴ .................... B65H 59/38; G11B 15/46
[52] U.S. Cl. ...................................... 318/7; 318/138; 318/254; 242/75.51; 360/73
[58] Field of Search ................. 318/6, 7, 138, 254; 242/75.44, 75.45, 75.47, 75.5, 75.51; 360/70, 71, 73

[56] References Cited

U.S. PATENT DOCUMENTS

| Re. 30,939 | 5/1982 | d'Alayer de Costemore d'Arc et al. ................................................ 318/7 |
| 3,910,527 | 10/1975 | Buhler et al. ....................... 318/7 X |
| 3,982,160 | 9/1976 | Goldschmidt et al. ................. 318/7 |
| 4,015,799 | 4/1977 | Koski et al. ......................... 242/203 |
| 4,125,881 | 11/1978 | Eige et al. .......................... 318/7 X |
| 4,157,488 | 6/1979 | Allan ............................... 242/186 X |
| 4,212,039 | 7/1980 | Koda ................................ 360/70 X |
| 4,347,538 | 8/1982 | Klank ............................ 360/72.3 X |
| 4,357,643 | 11/1982 | d'Alayer de Costemore d'Arc et al. ................................................ 360/137 |
| 4,366,371 | 12/1982 | d'Alayer de Costemore d'Arc et al. .............................................. 318/7 X |
| 4,394,994 | 7/1983 | Oono ................................... 318/6 X |
| 4,398,227 | 8/1983 | Anderson ......................... 360/73 X |
| 4,448,368 | 5/1984 | Skalko ................................ 242/186 |
| 4,461,433 | 7/1984 | Kani ................................. 318/7 X |
| 4,479,081 | 10/1984 | Harris .............................. 318/7 X |
| 4,479,159 | 10/1984 | Kamei et al. ..................... 242/191 X |
| 4,496,117 | 1/1985 | Kashiwagi et al. ................ 318/7 X |
| 4,519,039 | 5/1985 | Surana et al. ...................... 318/7 X |
| 4,525,654 | 6/1985 | Tajima et al. ......................... 318/7 |
| 4,531,166 | 7/1985 | Anderson ......................... 242/186 X |
| 4,536,806 | 8/1985 | Louth ................................... 360/69 |
| 4,573,645 | 3/1986 | Harris .............................. 242/186 X |
| 4,620,241 | 10/1986 | Ono .................................. 242/203 X |
| 4,635,138 | 1/1987 | Louth ............................... 360/73 X |
| 4,639,798 | 1/1987 | Harrison et al. ...................... 360/73 |
| 4,672,274 | 6/1987 | Suganuma ......................... 318/439 X |

Primary Examiner—Bentsu Ro
Attorney, Agent, or Firm—William F. Noval

[57] ABSTRACT

A reel to reel web transport apparatus includes an adaptive control which eliminates the necessity (1) for mechanical or vacuum web buffers, (2) for a capstan or tachometer to meter or control web velocity; and (3) for a tension transducer to control web tension. The web transport apparatus includes supply and takeup reels driven by brushless direct current (DC) motors. Hall device assemblies associated with the brushless DC motors provide Hall signals which are used during a learning mode to determine several unknown parameters for servo control of the web transport apparatus.

5 Claims, 7 Drawing Sheets

ADAPTIVE CONTROL SYSTEM FOR REEL TO REEL WEB TRANSPORT APPARATUS

BACKGROUND OF THE INVENTION

This invention relates in general to reel to reel web transport apparatus and more particularly to an adaptive control system for reel to reel web transport apparatus which eliminates the necessity for mechanical or vacuum web buffers; for a capstan or tachometer to meter or control web velocity; and for a tension transducer to control web tension.

Reel to reel web transport apparatus are commonly used to transport a web between supply and takup reels past a utilization device. For example, magnetic tape recorders record and reproduce audio and video signals, instrumentation signals and digital data. In the transport of magnetic tape between supply and takeup reels, past record/reproduce (read/write) heads, the tape is subjected to velocity variations such as acceleration, constant velocity and deceleration which causes tape tension variations. In order to effect interchangeability of tapes between different tape recorders and faithful recording and reproducing of information on the magnetic tape, it is desirable to maintain a controlled tension on the tape during transport. If the tape tension is too small during tape transport, the tape may slacken and be damaged by becoming entangled in the tape transport mechanisms or by being loosely wound on the takeup reel. If the tape tension is too great during tape transport, the tape may become stretched during recording or reproducing, and cause signal distortion and undesirable information degradation. It is thus desirable that a controlled tension be maintained on the tape during all phases of tape operation including loss of power to the tape drive motors.

Since the inertia of a reel of magnetic tape varies as the diameter of the tape pack decreases or increases during supply and takeup, tape tension also varies and a tape buffer or storage device has been used in order to minimize the effect of such tape tension variation. Buffer devices, such as spring loaded storage arm devices and vacuum column buffer devices, are disadvantageous because of their increased mechanical, electrical and control complexity and increased space requirements. Capstan drive tape transports are also mechanically and electrically complex.

It has also been proposed to use a web tachometer to control web velocity and tension transducers to control web tension. However, these devices are undesirable due to their mechanical and electrical complexity and their sensitivity to deterioration.

Thus, a reel-to-reel tape transport which uses separate motors for driving each reel offers several advantages over capstan drive tape transports, reel-to-reel transports which include buffer devices for tape tension and speed control, and tape transports which use tape velocity and tape tension sensors for servo control of the transport. The bufferless and capstanless reel-to-reel tape transport is simpler in mechanical structure, more space efficient, and requires fewer mechanical components. It also allows for a simpler and more efficient control system since only the reel motors need be controlled. Thus, a control system for a reel-to-reel web transport apparatus should provide controlled velocity and controlled tension of the tape over the full range of tape motion (e.g., at rest, acceleration, constant speed, and deceleration) in order to minimize recorded signal degradation caused by undertensioning or overtensioning the tape.

SUMMARY OF THE INVENTION

According to the present invention, there is provided an adaptive control system for a reel-to-reel web transport apparatus which eliminates the necessity (1) for mechanical or vacuum web buffers; (2) for a capstan or tachometer to meter or control web velocity; and (3) for a tension transducer to control web tension. The control system of the present invention is mechanically and electrically simple, consumes low power and is economical. According to an aspect of the present invention, brushless direct current motors having associated Hall device assemblies are used to drive supply and takeup reels of reel to reel web transport apparatus. During a learning mode before the start of normal operation of the web transport apparatus, the supply and takeup motors are rotated to produce Hall signals which are used to determine several unknown parameters necessary for control of the web transport. Such unknown parameters include radii of the web packs on the supply and takeup reels, area of the web pack, torque constants for the supply and takeup motors, torque drag, motor control currents to effect web acceleration and deceleration and web tension, web thickness and total number of wraps of web on the supply reel so that the length of the web is known. According to another aspect of the invention, a correction factor is determined for error in angular spacing of the Hall devices.

DESCRIPTION OF THE DRAWINGS

In a detailed description of the preferred embodiments of the invention presented below, reference is made to the accompanying drawings in which like numerals refer to like elements.

DESCRIPTION OF THE PREFERRED EMBODIMENT

General Description of Reel to Reel Web Transport Apparatus

Although the adaptive control of the present invention will be described with respect to a reel-to-reel magnetic tape transport apparatus, it will be understood that the present invention may be used advantageously in any reel-to-reel web transport apparatus. The structure and operation of an exemplary apparatus will be described first, in order to facilitate an understanding below of the web transport control system of the invention.

Figure 1:
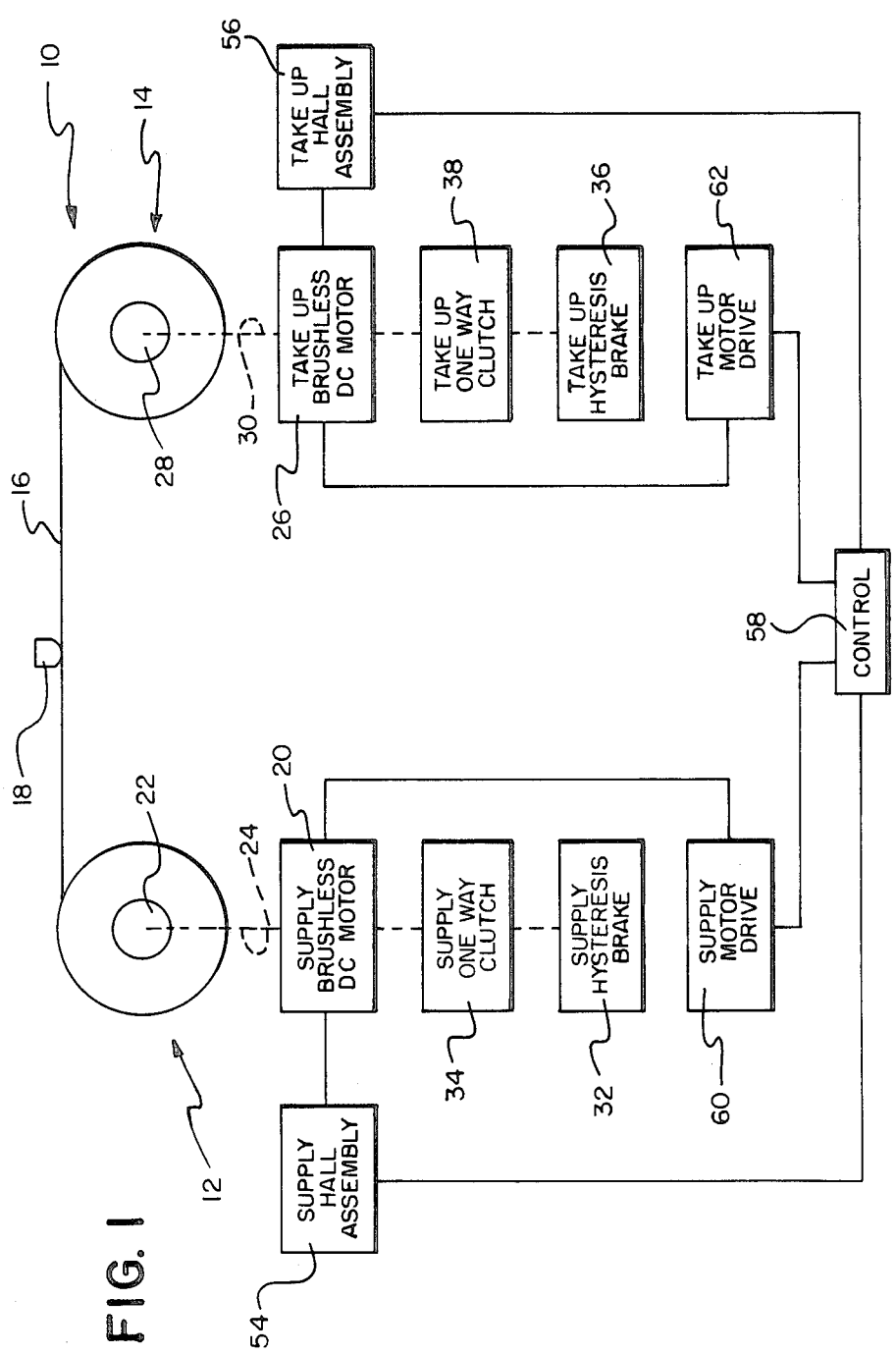
FIG. 1 is a block schematic diagram showing web transport apparatus including an embodiment of the present invention.

Referring to FIG. 1, there is shown a block schematic diagram of a magnetic tape transport apparatus including an embodiment of the present invention. An exemplary apparatus is a "serpentine" magnetic tape recorder in which information is recorded on magnetic tape in successive parallel longitudinal tracks as the tape is alternately transported back and forth between supply and takeup reels past a magnetic read/write head which is stepped transversely of the web transport direction. As shown, apparatus 10 includes a supply reel 12 and a takeup reel 14 for magnetic tape 16 transported past a magnetic read/write head 18. Supply reel 12 supports a pack of magnetic tape 16 and is contained in a cartridge or cassette (not shown) which is removable from apparatus 10. Tape 16 is transported from reel 12, past magnetic head 18 to takeup reel 14. When reel 12 is almost empty of tape 16 and reel 14 is almost full, the direction of transport of tape 16 is reversed and tape 16 is transported from reel 14 to reel 12. The transport of tape 16 between reels 12 and 14 in opposite directions, continues as head 18 records successive longitudinal magnetic tracks of information on tape 16 across the width thereof.

Figure 7:
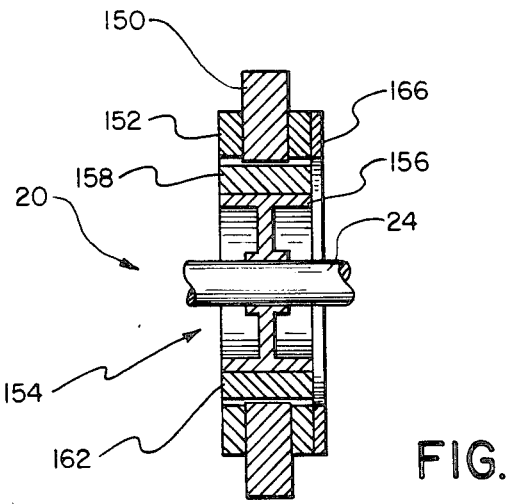
FIGS. 7 and 8 are respectively partially sectional side elevation and front elevational diagrammatic views of an exemplary brushless direct current motor for use in the apparatus of FIG. 1.
Figure 8:
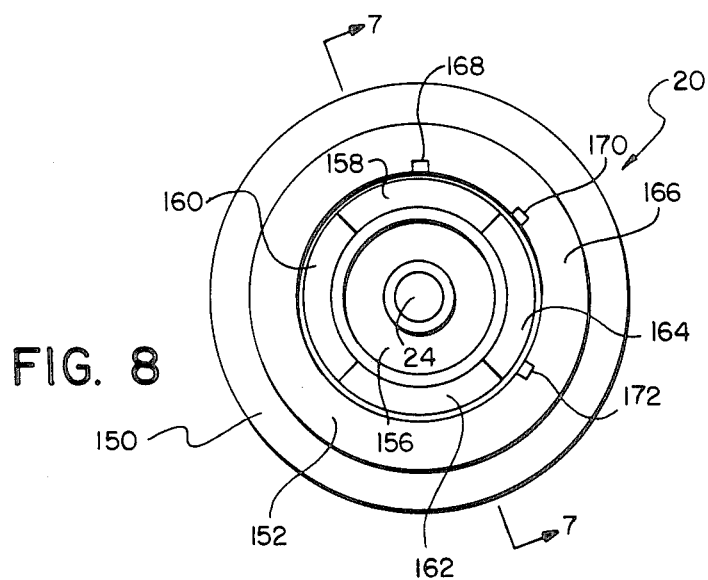

A supply brushless direct current (DC) motor 20 is directly coupled to the hub 22 of supply reel 12 by means of shaft 24. A takeup brushless DC motor 26 is directly coupled to the hub 28 of takeup reel 14 by means of shaft 30. Brushless DC motors 20 and 26 may, for example, be those provided by the Clifton Precision Division of Litton Industries and sold as a kit under Part No. D1-3522-3A-C. An exemplary brushless DC motor is shown in FIGS. 7 and 8 and will be described later.

As shown in FIG. 1, a supply magnetic hysteresis brake 32 is coupled to shaft 24 of supply brushless DC motor 20 by means of supply one-way clutch 34. A takeup magnetic hysteresis brake 36 is coupled to shaft 30 of takeup brushless DC motor 26 by means of takeup one-way clutch 38. One-way clutches 34 and 38 may, for example, be drawn cup roller clutches such as those supplied by the Torrington Company of Montebello, Calif.

The magnetic hysteresis brake is only coupled to a reel (through the motor shaft) when the reel is rotated in an unspooling direction to apply a controlled torque to the reel and consequently a controlled tension to tape 16. This tension is independent of the rotational speed of the unspooling reel. With this arrangement, whichever reel unspools tape (i.e. reel 12, when tape is transported in a direction from reel 12 to reel 14 or reel 14, when tape is transported in a direction from reel 14 to reel 12) is automatically connected to its respective hysteresis brake by action of its associated one way clutch.

Figure 2:
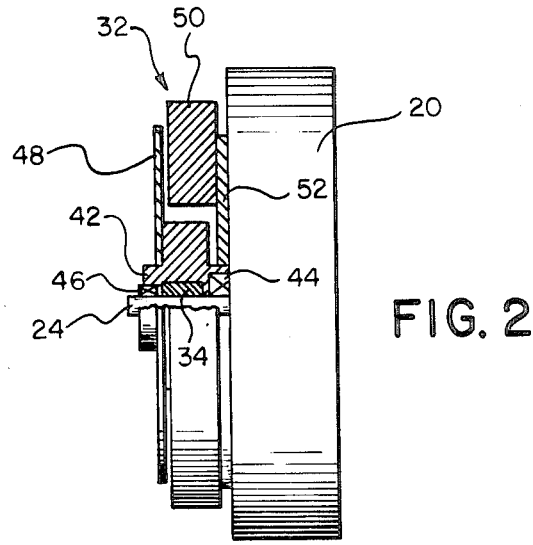
FIG. 2 is a partially sectional elevational view illustrating one arrangement of motor, clutch and brake of the apparatus of FIG. 1.

Referring to FIG. 2, there is shown an exemplary arrangement of brushless DC motor, one-way clutch and magnetic hysteresis brake. As shown, a brushless DC motor, such as supply motor 20, has a shaft 24 upon which is mounted magnetic hysteresis brake 32. Hysteresis brake 32 includes a hub 42 rotatably mounted on shaft 24 by means of bearings 44 and 46; a rotatable magnetic hysteresis disk 48 mounted on hub 42; and a stationary permanent magnet 50 mounted on magnetic plate 52 which is secured to motor 20. A drawn cup roller one-way clutch 34 is mounted between shaft 24 and hub 42. In one direction of rotation of motor 20, clutch 34 allows shaft 24 to freely rotate within hub 42. In the reverse direction of rotation of motor 20, one-way clutch 34 locks hub 42 to shaft 24 so that disc 48 rotates with shaft 24 and a torque is produced through the interaction between the magnetic disc 48 and stationary magnet 50. Takeup motor 26, takeup one way clutch 38 and takeup hysteresis brake 36 are structurally arranged in a similar manner.

Referring now to FIGS. 7 and 8, there is shown in greater detail an exemplary brushless direct current motor 20. Motor 26 is preferably of identical construction. Motor 20 is a three phase, wye connected motor including stator 150 having windings 152 and a rotor 154 including shaft 24, hub 156 and permanent magnets 158, 160, 162 and 164 circumferentially mounted on hub 156. A circuit board assembly 166 includes Hall effect devices 168, 170, 172 (Box 54 of FIG. 1). Assembly 166 includes electrical connections (not shown) for supplying power to the three phase, wye connected coils; for supplying bias to Hall effect devices 168, 170, 172; and for receiving the output signals HS1, HS2 and HS3 (FIG. 5) from devices 168, 170, 172. Hall effect devices produce an output signal which is a function of the magnetic field to which the device is exposed. Device 168 is mounted at a position represented as "0" mechanical degrees; device 170 is mounted at "60" mechanical degrees and device 172 is mounted at "120" mechanical degrees. As magnets 158, 160, 162 and 164 rotate past devices 168, 170, 172; device 168 produces signal HS1 (FIG. 5), device 170 produces signal HS2, and device 172 produces signal HS3. The signals HS1, HS2, HS3 change state every 15 mechanical degrees or 24 times every revolution of motor 20. The time T (FIG. 5) between two consecutive changes in the Hall signals is a measure of the radial velocity of the motor and connected reel.

The signals (e.g., HS1, HS2, HS3) produced by Hall device assemblies 54 and 56 are applied to control circuit 58. Circuit 58 produces control voltages and commutation signals to control the operation of motors 20 and 26 respectively through supply motor drive circuit 60 and takeup motor drive circuit 62.

Figure 3:
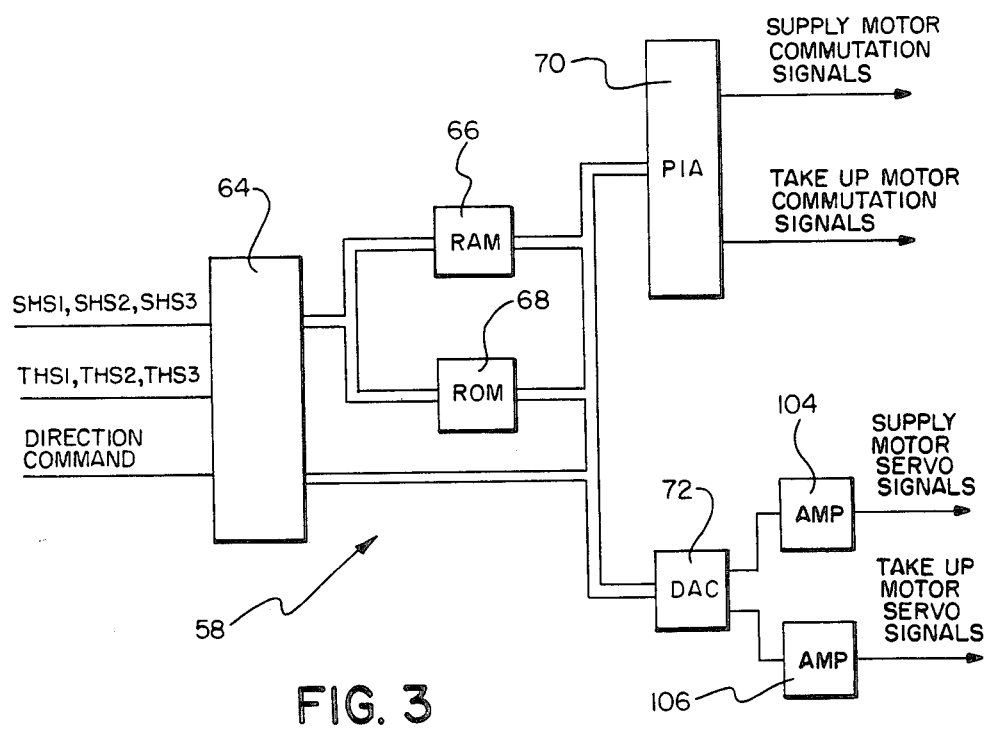
FIG. 3 is a block schematic diagram showing details of the control circuit of the apparatus of FIG. 1.

As shown in FIG. 3, control circuit 58 includes a microprocessor 64, random access memory (RAM) 66, read only memory (ROM) 68, peripheral interface adapter (PIA) 70, and digital to analog converter (DAC) 72. Microprocessor 64 may, for example, be an 8-bit, 16-bit or other standard microprocessor known to those skilled in the art. The RAM 66, ROM 68, PIA 70 and DAC 72 are typically matched to a microprocessor manufactured by a specific company. In general, the programming and operation of microprocessors and related peripheral devices are well known to those skilled in the art and are explained for example, in the Harvard textbook entitled "The Art of Electronics", by Horowitz and Hill, Cambridge University Press, Cambridge, Mass., in the chapter entitled "Microprocessors", Chapter 11 at page 484 et seq.

Figure 4:
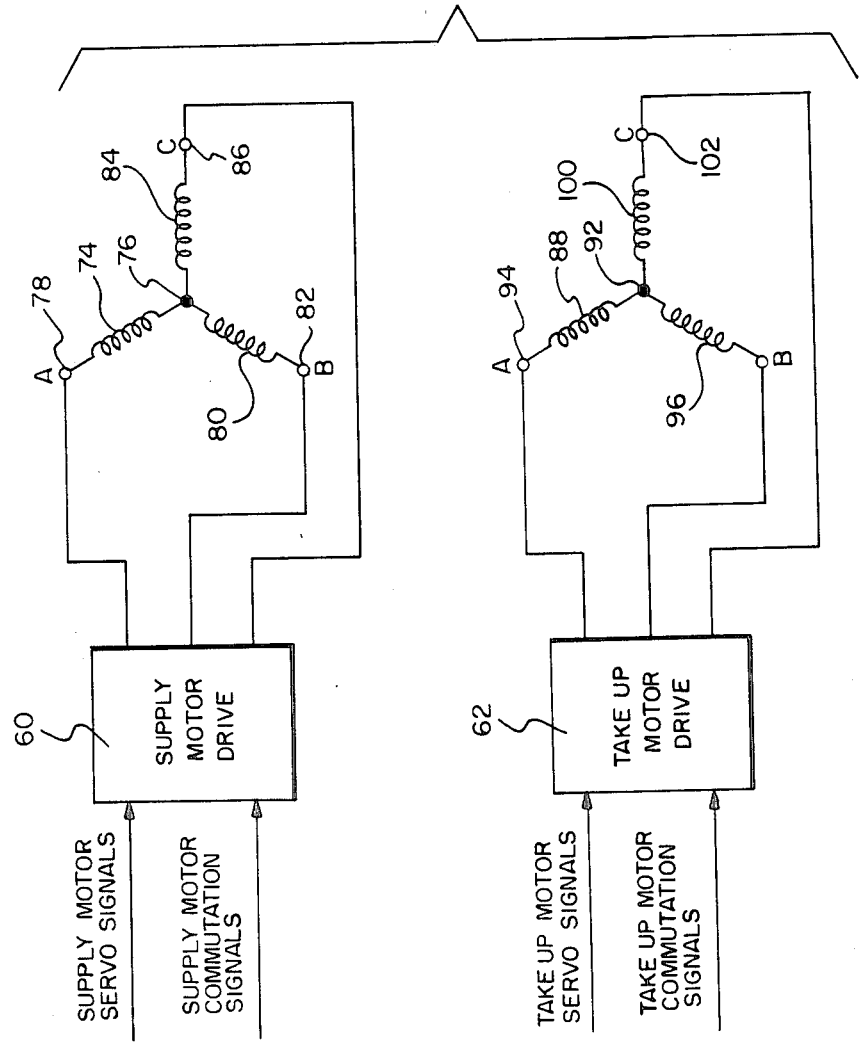
FIG. 4 is a block schematic diagram showing details of the motor drive circuits of the apparatus of FIG. 1.

Referring now to FIG. 4, there is shown in greater detail, motor drive circuits 60 and 62 and the three phase windings of motors 20 and 26. Thus, the supply motor 20 includes phase A winding 74 connected between terminal 76 and "A" terminal 78; a phase B winding 80 connected between terminal 76 and "B" terminal 82; and phase C winding 84 connected between terminal 76 and "C" terminal 86. Similarly, takeup motor 26 includes a phase A winding 88 connected between terminal 92 and "A" terminal 94; phase B winding 96 connected between terminal 92 and "B" terminal 98; and phase C winding 100 connected between terminal 92 and "C" terminal 102. Circuits 60 and 62 include appropriate motors and switches for controlling operation of motors 20 and 26.

Figure 5:
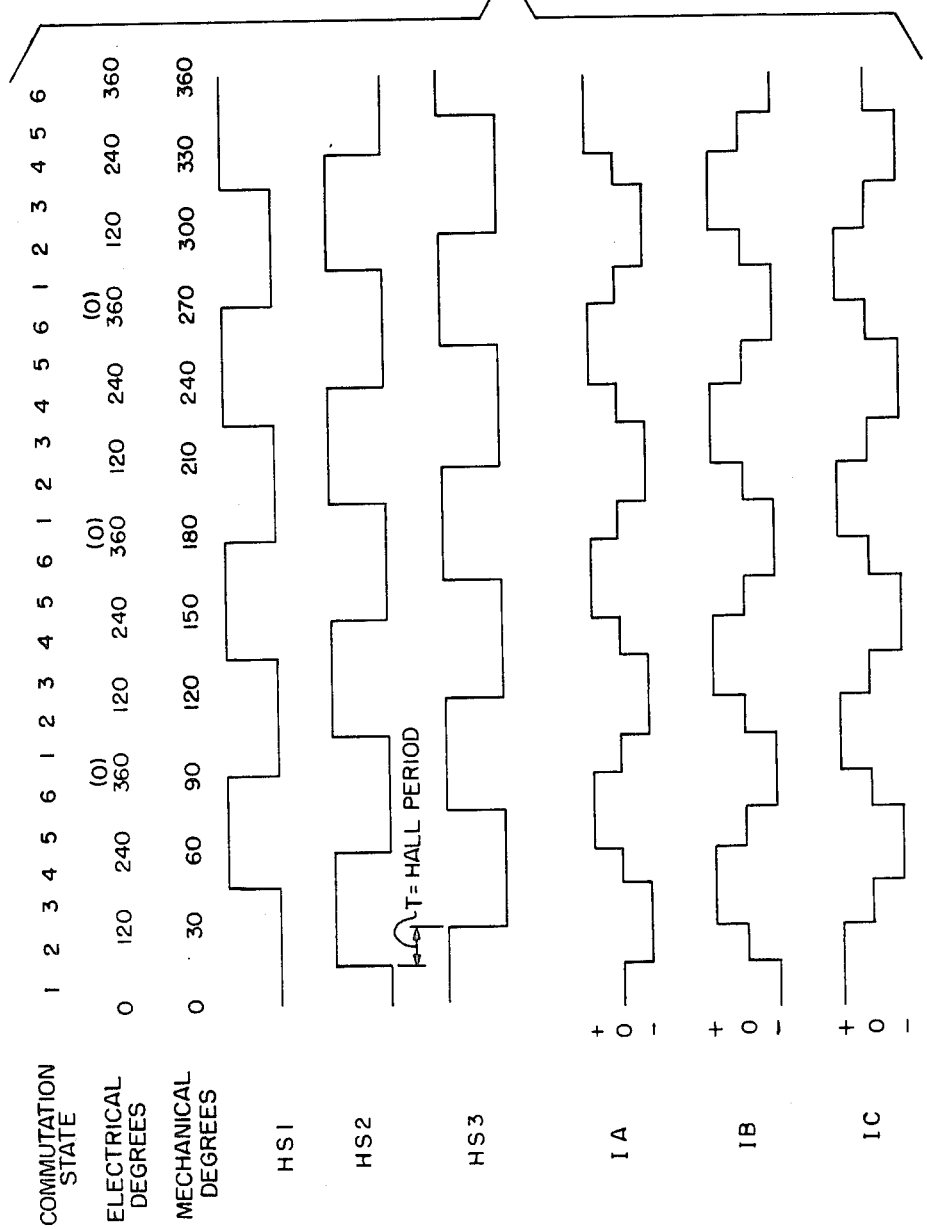
FIG. 5 is a group of waveform diagrams which illustrate the operation of the apparatus of FIG. 1.

Referring to FIG. 5, there are shown exemplary current waveforms IA, IB and IC which flow respectively through coils A, B and C. In the wye connection of coils A, B, C, electrical current flows through two of the three coils, while no current flows in the third coil. Since the exemplary motors 20 and 26 each have four permanent magnets in the rotor, for each revolution of the rotor, four complete cycles of current are produced in the stator coils. Thus, in each coil, there is a complete 360° electrical current cycle for every 90° mechanical displacement of the rotor.

Figure 6:
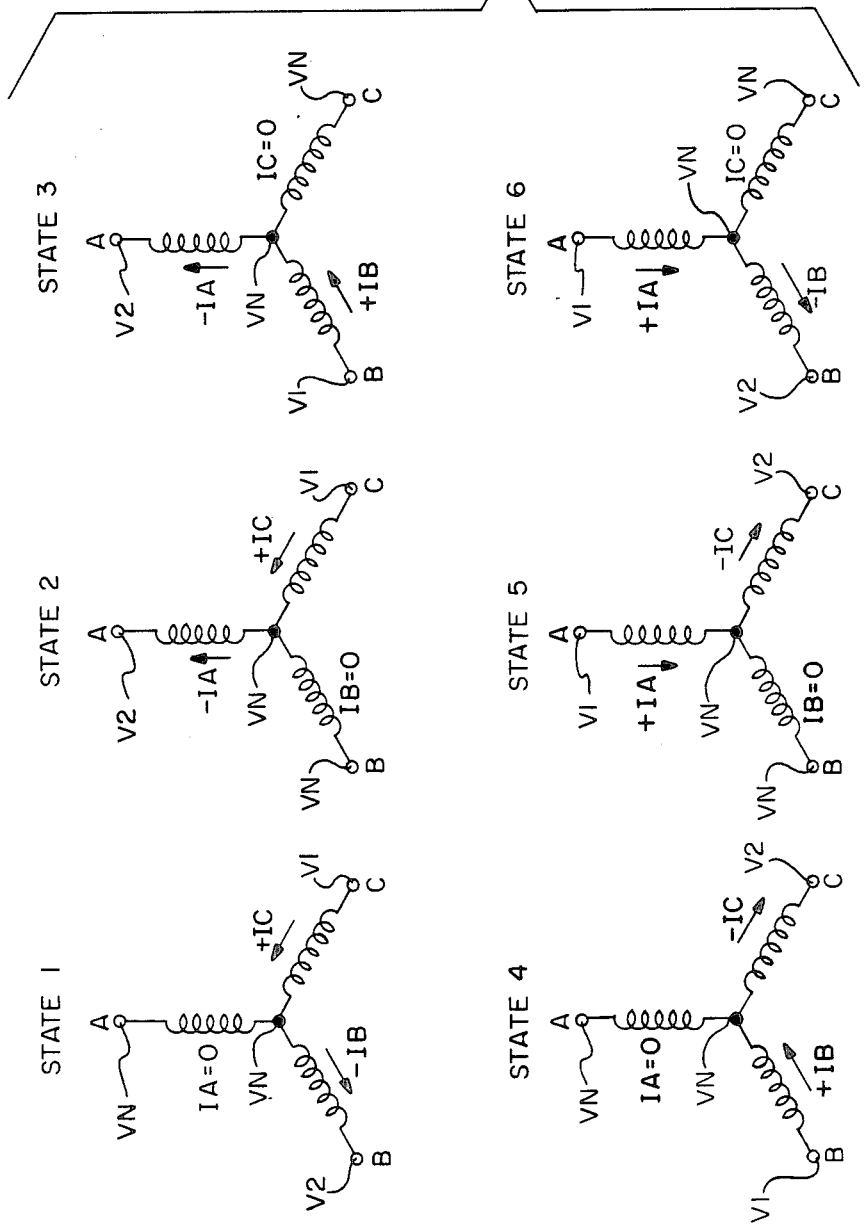
FIG. 6 is a group of schematic diagrams illustrating operation of the motor drive circuits of FIG. 4.

Operation of motor 20 for a complete electrical cycle will be explained with reference to FIGS. 5 and 6. During commutation state (1), current flows from terminal C to terminal B so that the current IC is positive and the current IB is negative. No current flows in coil A (IA equals zero). During state 2, the current sink is switched from coil B to coil A so that current flows from terminal C to terminal A (IC is positive, IA is negative and IB is zero). During state 3, the current flows from terminal B to terminal A (IB is positive, IA is negative and IC equals zero). During state 4, the current sink switches from coil A to coil C and current flows from terminal B to terminal C. (IB is positive, IC is negative and IA equals zero). During state 5, the current flows from terminal A to terminal C through coils A and C (IA is positive, IC is negative and IB equals zero). During state 6, the current flows from terminal A to terminal B through coils A and B (IA is positive, IB is negative, and IC equals zero). This sequence is repeated three more cycles to effect a single revolution of the rotor. It is to be noted that, for example, during state 1, IC equals IB but because of the direction of current flow through the coils, IC is positive whereas IB is negative.

The value of the current flowing through the coils of motors 20 and 26 is determined by the voltages applied to terminals A, B and C and is a function of the control algorithm applied to motors 20 and 26 to effect acceleration, constant speed and deceleration of tape 16 as it is transported between reels 12 and 14. Determination of unknown parameters of such motor control algorithm is explained below. In the examples shown in FIG. 6, it is assumed that terminal O is maintained at a constant voltage VN from state to state. For example, during state 1, a voltage VN is applied to terminal A and the voltage across coil A between terminal O and terminal A equals zero so that IA equals zero. The voltage between terminal C and terminal O equals the voltage between terminal O and terminal B so that IC equals IB. Thus, if a voltage V1 is applied to terminal C, the voltage V2 applied to terminal B must satisfy the equation $V1 - VN = VN - V2$. For example, if VN is maintained constant at 6 volts and V1 equals 11 volts, to provide a voltage of 5 volts across coil C, the voltage V2 applied to terminal B equals 1 volt, so that the voltage across coil B is also 5 volts).

ADAPTIVE CONTROL SYSTEM

According to the present invention, after a cartridge of tape is inserted into the magnetic tape transport apparatus, the apparatus is operated in a learning mode to determine several unknown parameters needed for servo control during normal operation. Such unknown parameters include radii of the web pack on the supply and takeup reels, total area of the web pack, torque constants for the supply and takeup motors, torque drag, web thickness, total number of wraps of web on the supply reel, length of tape, motor control currents to effect web tension control and web velocity control. These parameters are determined by control circuit 58 from known parameters including the radius of the takeup reel hub (which is permanently mounted in apparatus 10) and the period between consecutive Hall signal transitions for the supply and takeup motors.

Figure 9:
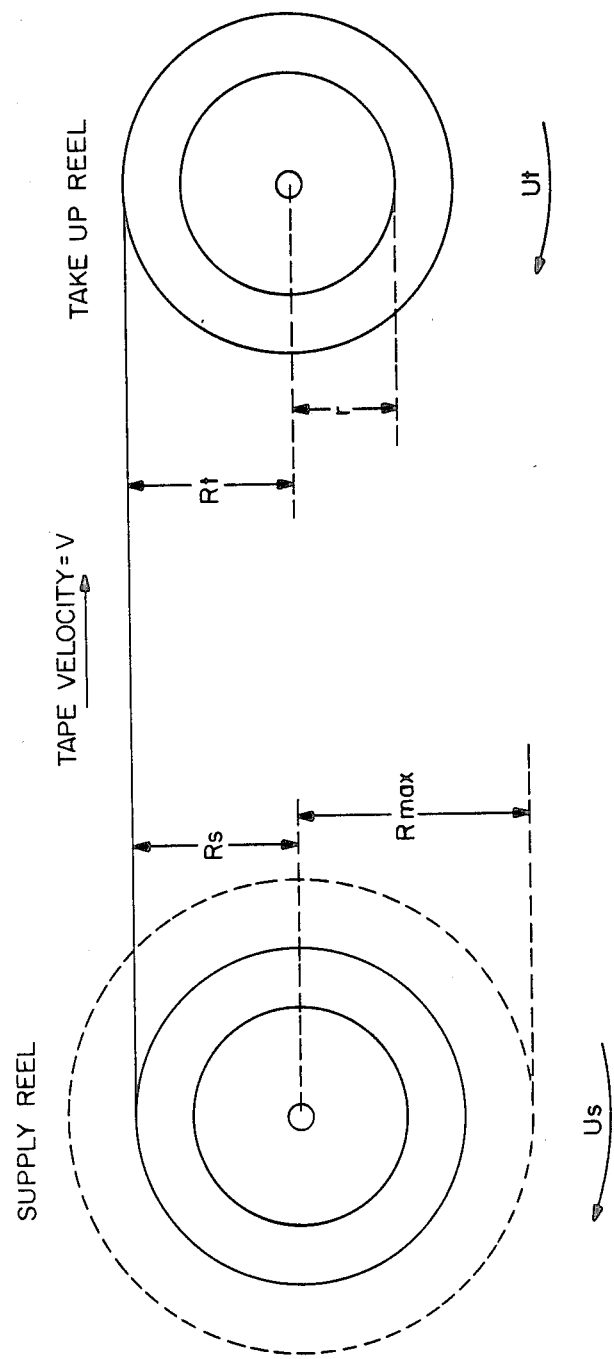
FIG. 9 is a schematic diagram useful in explaining the present invention.

FIG. 9 illustrates basic parameters useful in determining other control parameters. The radius of the pack of tape on the supply reel at any time is referred to as R and the radius of the pack of tape on the takeup reel at any time is referred to as Rt. During operation of the tape transport, Rs and Rt continually change due to the transport of tape from one reel to the other. Since the takeup reel is permanently mounted in apparatus 10, the radius of its hub is a known quantity and is referred to as r. The maximum radius of tape on the supply reel before threading is referred to as Rmax. The angular velocities of the supply and takeup reels are referred to as Us and Ut, while the velocity of the tape is referred to as V.

DEFINITIONS

Below are definitions of terms used in the following explanation of the determination of the servo control parameters according to the adaptive control system of the present invention.

rt = inner radius of takeup reel
rs = inner radius of supply reel
r = designed radius of takeup reel
Rt = radius of tape pack on takeup reel
Rs = radius of tape pack on supply reel
Rmax = maximum radius of the tape pack
Qc = Rs/Rt
At = area of tape pack and hub on takeup side
As = area of tape pack and hub on supply side
Atot = total area of tape packs and hubs (As + At)
Ac = As/At
Trevt = period of one revolution of takeup reel
Trevs = period of one revolution of supply reel
Tt = period between two consecutive hall signal transitions (1/24 rev) of takeup reel
Ttcor = effective Tt after correction for Hall device misplacement (Ttcor = Tt* Ki)
Ki = correction factor for Tt to account for hall device misplacement
Ts = period between two consecutive hall signal transitions (1/24 rev) of supply reel
ut = radial velocity of takeup reel
us = radial velocity of supply reel
uct = desired radial velocity of takeup reel
i = index to the angular position of takeup reel (i = 0-23)
Oi = angular length of arc between the ith and the (i+1)th hall positions
Oci = Oi/2PI/24)
Kt = takeup motor torque constant
Ks = supply motor torque constant
Jt = takeup reel assembly inertia (motor, reel, and tape inertias combined)
Jt = takeup reel assembly inertia (motor, reel, and tape inertias combined)

x|y = quantity x when measured under the conditions y

DETERMINATION OF VELOCITY CONTROL PARAMETERS

The velocity portion of the serve control is always maintained on the takeup reel, regardless of web direction. Therefore, to keep a constant linear tape velocity in spite of a changing web radius, it is necessary to measure the radial velocity of the takeup reel and to calculate the appropriate radial velocity of the takeup reel to maintain the desired linear tape velocity.

As an example, it is assumed that the desired linear tape velocity is 80 ips. Therefore:

$$uct = (80 \text{ ips})/(2*PI*Rt).$$

The question now arises as to how to measure Rt.

Rt can be determined if the quantity (At+ As) and the ratio As/At are known.

$(At+As)=$ Atot ... therefore ... $At=Atot-As$ $As/At=Ac$ ... therefore ... $As=Ac*At$ ... combining the two equations, $$At = Atot - Ac*At$$

$$At + Ac*At = Atot$$

$$At = Atot/(1+Ac)$$

And $$Rt = (At/PI)^{.5}$$
$$= (Atot/[(1 + Ac) * PI])^{.5}$$

But $$Ac = As/At = PI * Rs^2/(PI * Rt^2)$$
$$= Rs^2/Rt^2$$
$$= (Rs/Rt)^2$$
$$= Qc^2$$

And $Rt = (Atot/[(1 + Qc^2) * PI])^{.5}$

Since Atot is a constant for a given cartridge of tape, this value can be measured at any time. Assume it is measured when all of the tape is on the supply reel. In this case, Rt| takeup reel empty=r, since the bare hub of radius r is exposed on the takeup reel.

For brevity, the condition, when the takeup reel is empty, is called the "init" condition. Therefore, Rt| takeup reel empty=Rt| init=r. And $$At|\text{init} = PI * (Rt|\text{init})^2$$
$$= PI * r^2$$

$R_S = Q_c * R_t$

Therefore, $$Rs|\text{init} = (Qc|\text{init}) * (Rt|\text{init})$$
$$= (Qc|\text{init}) * r$$

and $As = PI * (Rs|\text{init})^2$
$$= PI * [(Qc|\text{init}) * R]^2$$

$Atot = At + As = PI * r^2 + PI * [(QC|\text{init}) * r]^2$
$$= PI * r^2 * [1 + (Qc|\text{init})^2]$$

Above, it was found that the following relation is true:

$$Rt = (Atot/[(1+Qc^2)*PI])^{0.5}$$

Substituting the results above for Atot;

$$Rt = (PI * r^2 * [1 + (Qc|\text{init})^2]/[(1 + Qc2) * PI])^{.5}$$
$$= r * [[1 + (QC|\text{init})^2]/[1 + Qc^2]]^{.5}$$

It is therefore concluded that Rt can be measured at any instant if the quantity Qc can be measured at any instant.

But, Qc=Rs/Rt. However, if the tape relocity is a constant velocity of 80 ips, then Trevs=(2*PI*Rs)/80 ips. Therefore, Rs is proportional to Travs, and similarly for Rt and Trevt, and it is concluded that Qc=Trevs/Trevt. The measurement of Qc is now trivial. The control circuit 58 simply times the period of a full revolution of each reel and takes their ratio as Qc. So, Rt can be computed at any instant by computing Qc at any instant and only once computing Qc| init. The latter is done immediately after tape is loaded onto the takeup reel.

The problem still remains as to how to calculate ut, the measured angular velocity of the takeup reel. Now, ut=2*PI*/(24*Tt). Since it has just been established that Rt can be measured at any instant, and Tt can be measured easily by timing the period between two successive hall signals on the takeup reel, so that ut can be easily computed.

DETERMINATION OF HALL PERIOD CORRECTION FACTOR (Ki)

Unfortunately, there is a complication with the previous result. The equation above assumes that the spacing between the hall signals is exactly 1/24 of a revolution apart. In reality, this is not so. The placement of the hall devices may vary from their ideal positions up to ±25%. This misplacement would result in an incorrect measure of ut.

According to the present invention, to correct this problem, the value for Tt is scaled by an appropriate factor Ki, where i indicates the angular position around the reel (i =0-23). Therefore the equation for ut is:

$$ut = 2*PI*Rt/(24*Ki*Tt)$$

(In fact, we must uniquely determine Ki for each direction of the motor, as the hall sensor signals are also a function of direction).

Ki is determined as follows: For an angular position i, Tt is measured. This Tt must be corrected by a factor of Ki such that the product will represent the amount of time that would have been measured if the changes in the Hall signals were equally spaced. Now, Ttcor=Ki

*Tt. It is known that a distance of Oi was moved in Tt time. Therefore, $$ut = Oi/Tt$$

The time required to move 2*PI/24 radians, given the above speed, is as follows (note that this time is the quantity Ttcor):

$$ut = Oi/Tt = (2*PI/24)/Ttcor$$

Therefore, $$\begin{aligned} Ttcor &= 2*Pi*Tt/(24*Oi) \\ &= PI*Tt/(12*Oi) \end{aligned}$$

But Ki=Ttcor/Tt.
Therefore, Ki=PI/(12*Oi).

Thus, Ki can be calculated given Oi. To determine Oi, the following is done:

1. With no tape on the takeup reel, it is rotated at a sufficiently high velocity such that the inertia will wash out any flutter, by applying a sizable current to the takeup motor.

2. When the takeup reel has achieved a high velocity, the control circuit 58 can then measure the periods Tt| high speed between each successive hall signal, as well as measure the total period of one revolution, Trevt| high speed.

3. Oi can then be calculated. Since it is assumed that the takeup reel is rotating at a constant angular velocity, this velocity is given by 2*PI/(Trevt| high speed). Therefore, the following must also hold true:

$$Oi = [2*PI/(Trevt|\text{ high speed})]*[Tt|\text{ high speed}]$$

since Ki=PI/(12*Oi), $$\begin{aligned} Ki &= PI/(12*[2*PI/(Trevt|\text{high speed})]* \\ & \quad [Tt|\text{high speed}] \\ &= [Tt|\text{high speed}]/[24*(Trevt|\text{high speed})] \end{aligned}$$

DETERMINATION OF MOTOR CONSTANT (Kt) AND DRAG TORQUE (Tdrag)

Kt and Tdrag are determined as follows: Jt is calculated by adding the known inertias of the motor, the reel, and the takeup reel tape pack. Since the latter is a function of radius, the tape inertia is calculated by first calculating the radius Rt, and then determining the inertia of an annulus of tape given its mass density. Kt is a value which may vary from motor to motor. Essentially, Kt is the slope of the curve when torque is plotted against current. Therefore, Kt has the units of Newton*Meters/Amp. Kt must somehow be determined. In the process of calculating Kt, Tdrag is also calculated the total drag torque in the motor assembly.

If a constant current I is applied to a motor with torque constant Kt and with total torque drags equivalent to Td, then there is obtained a torque of I*Kt−Tdrag. When the motor is loaded with a total inertia of Jtot, including the motor inertia itself, then there is observed an angular acceleration equivalent to (I*Kt−Tdrag)/Jtot for I*Kt>=Tdrag, and 0 for I*Kt<Tdrag. Both Kt and Tdrag can be determined by applying at least two currents which effect an acceleration of the real. Let the observed accelerations for the current I1 and I2 be called a1 and a2 respectively. Therefore, $$(I1*Kt - T\text{drag})/J\text{tot} = a1$$

and $$(I2*Kt - T\text{drag})/J\text{tot} = a2.$$

$$I1*Kt - a1*J\text{tot} = T\text{drag}$$

$$Kt = (a2*J\text{tot} + T\text{drag})/I2$$

Thus, $$\begin{aligned} T\text{drag} &= I1*(a2*J\text{tot} + T\text{drag})/I2 - a1*J\text{tot} \\ &= (a2*J\text{tot} + T\text{drag})*(I1/I2) - a1*J\text{tot} \\ &= (a2*J\text{tot}*I1/I2 - a1*J\text{tot})/(1 - I1/I2) \end{aligned}$$

and $$\begin{aligned} Kt &= [a2*J\text{tot} + (a2*J\text{tot}*I1/I2 - a1*J\text{tot})/(1 - I1/I2)]/I2 \\ &= J\text{tot}*[a2 + (a2*I1/I2 - a1)/(1 - I1/I2)]/I2 \end{aligned}$$

DETERMINATION OF ACCELERATION/DECELERATION PROFILES

The calculation of the acceleration, and deceleration profiles can be determined as follows. If, for example, it is desired to accelerate to 80 ips in 300 ms, requiring an acceleration of 266.67 inches/sec$^2$, for a given radius Rt, the reel needs to be accelerated at an angular acceleration of 266.67/Rt radians/sec$^2$. Since the angular acceleration required is known, there can be calculated, at any time, the appropriate angular velocity as:

$$uct = (266.67/Rt)*t$$

where t=0 represents the start of the acceleration profile.

DETERMINATION OF WEB TENSION CONTROL PARAMETERS

The tension control is open loop, which eliminates the need for a tension transducer. Furthermore, the tension control is applied only on the supply reel. Then the creation of the tension is simply a matter of applying the correct amount of current to the supply reel such that it requires the velocity servo on the takeup reel to supply the appropriate amount of current to counteract the supply side. This action will create tension. The appropriate current to apply to the supply motor is a function of tension at the head, the tension drops across the guides, the supply motor's Kt and Tdrag, the direction of motion, Rs, and whether or not the tape is being accelerated.

Let it be assumed that tape is being transported onto the takeup reel. This implies that the tension at the supply motor will have to be 4 ounces (the desired tension near the head) less the tension drops across the guides (not shown) between the head and the supply reel. Let it be assumed that the latter is 1 ounce. This implies that the desired tension at the supply reel is 3 ounces.

Now Tdrag, the total torque drag at the supply reel, includes the magnetic hysteresis brake torques. (since hysteresis brakes are used, Tdrag is also a function of direction) To create a tension of 3 ounces at a radius Rs, there must be applied a torque of:

$$T_{applied} = 3 * Rs$$

But $T_{applied} = T_{motor} - T_{drag}$, and $T_{motor} = I_{tension} * Ks$.

Therefore, $I_{tension} * Ks - T_{drag} = 3 * Rs$, and $I_{tension} = (3 * Rs + T_{drag})/Ks$.

In addition, there needs to be calculated any current for acceleration. Assume that angular acceleration is given by a (a can be positive, negative, or zero).

This current is given by:

$$I_{accel} = a * Js/Kt$$

Therefore, the total current to apply to the supply reel is given by:

$$\begin{aligned}I_{total} &= I_{tension} + I_{accel} \\ &= (3 * Rs + T_{drag}) + a * Js/Kt\end{aligned}$$

This then requires that Rs can be calculated. But, it is known that $Qc = Rs/Rt$, and Rt is known. Thus, Rs is given by the equation:

$$Rs = Qc * Rt$$

DETERMINATION OF WEB PARAMETERS

The tape cartridge used in the exemplary apparatus does not mechanically anchor the end of tape (web) to the supply reel. Therefore, special precautions must be taken to ensure that it is known how much total length of tape is in the reel. This is done as follows:

First, Rmax is calculated from Qc| init. Since Qc| init is measured when all of the tape is on the supply reel, the following holds true:

$$Rmax = (Qc \mid init) * r$$

To know the number of wraps of tape on the entire supply reel, the thickness of tape must be determined. This is done by spooling tape onto the takeup reel until $Nth = n*Nsh$, where n is a constant (1.5, for example) and Nth and Nsh represents the accumulated angular rotation (measured in halls, or 1/24 of a revolution) taken by the takeup and supply reels respectively. The value of Nt taken under this condition can then be used to find the thickness.

First, the total area of both hub and tape is calculated. This is given by:

$$Atot = PI * r^2 + PI * Rmax^2$$

and in terms of Nt and Ns we have:

$$Atot = PI * (r + Nt * thickness)^2 + PI * (Rmax - Ns * thickness)^2$$

where Nt and Ns are the number of revolutions taken on the takeup and supply reels respectively.

$$(Nth = 24 * Nt; Nsh = 24 * Ns)$$

Therefore, it follows that:

$$r^2 + Rmax2 = (r + Nt * thickness)^2 + (Rmax - Ns * thickness)^2$$

But $$\begin{aligned}Nt &= n * Ns. \\ r^2 + Rmax^2 &= (r + Nt * thickness)^2 + \\ &\quad [Rmax - (Nt/n) * thickness]^2 \\ &= r^2 + 2 * Nt * thickness * r + (Nt * thickness)^2 + \\ &\quad Rmax^2 - 2 * (Nt/M) * thickness * Rmax + \\ &\quad [(Nt/n) * thickness]^2\end{aligned}$$

After simplifying:

$$\begin{aligned}0 &= 2 * Nt * r * thickness + (Nt * thickness)^2 - \\ &\quad 2 * (Nt/M) * thickness * Rmax + \\ &\quad [(Nt/n) * thickness]^2 \\ &= 2 * r + Nt * thickness - 2 * Rmax/n + Nt * thickness/(n^2)\end{aligned}$$

and thickness is given by:

$$thickness = 2 * (Rmax/n - r)/[Nt * (1 + 1/n^2)]$$

substituting $Nth/24 = Nt$, we have:

$$thickness = 48 * (Rmax/n - r)/[Nth \mid Nt = n * Ns * (1 + 1/n^2)]$$

Note: all of the above equations are taken at the condition where $Nt = n*Ns$. In our case, $n = 1.5$.

With the thickness of tape now known, the total number of wraps of tape are found by the following equation:

$$\text{number of wraps} = (Rmax - r)/thickness$$

Thus, there will be known how many total wraps of tape are available on the reel. By keeping track of the number of wraps already taken during the operation of the transport, there will be known approximately how many wraps of tape are left.

The next issue is the measurement of Qc| init. Since this measurement affects the ability to measure the amount of tape on the reel, it is necessary to insure that it is as accurate as possible. It was noticed that the Qc parameter versus the number of wraps of tape taken on the takeup reel is a function of very little curvature. Thus, it seemed possible to estimate the curve in any small area as a straight line.

Advantage of this fact can be taken by measuring Qc for 20 wraps near the desired point of measurement. These results are then fit to the least mean squared error estimate to a straight line, and the fitted curve is then calculated for a Qc value for the area in question. This greatly reduced the amount of noise which would otherwise affect our measurement had only one value for Qc been taken. With this done, it is possible to very accurately measure the tape's physical parameters.

The invention has been described in detail with particular reference to preferred embodiments thereof but it will be understood that variations and modifications can be effected within the spirit and scope of the invention.

What is claimed is:

1. An apparatus for transporting a web between supply and takeup reels comprising:
a supply brushless direct current (DC) motor connected to said supply reel;

a takeup brushless DC motor connected to said takeup reel;

a supply Hall device assembly mounted on said supply motor for producing supply Hall signals;

a takeup Hall device assembly mounted on said takeup motor for producing takeup Hall signals;

control means for producing from said supply Hall signals and said takeup Hall signals, both commutation control signals and servo voltage signals for controlling the rotation of said supply and takeup motors to effect transport of said web between said supply and takeup reels;

wherein each of said Hall device assemblies includes at least two angularly spaced Hall devices and wherein said Hall signals produced by said Hall devices are out of phase with each other such that the period between changes in signal value between two consecutive Hall signals is a measure of the radial velocity of the respective motor; and wherein said control means applies a correction factor to said Hall periods to correct for any misplacement in the angular position of said Hall devices.

2. The apparatus of claim 1 wherein said control means (1) controls said takeup motor to rotate said takeup reel, without any web on it, at a high rotational speed; (2) measures the Hall period between successive changes in Hall signals and the period of one revolution of said takeup motor at said high speed; and (3) determines said correction factor as a function of said Hall period and revolution period.

3. The apparatus of claim 1 wherein said control means operates said apparatus (1) in a learning mode to determine from said Hall signals the motor torque constants and drag torques of said supply and takeup motors; and (2) in a web transport mode to control the rotation of said motors as a function of said motor torque constants and drag torques determined during said learning mode.

4. The apparatus of claim 3 wherein in said learning mode said control means (1) applies to each of said motors two different known currents which effect different accelerations of said motors; (2) measures the two accelerations; and (3) determines the motor torque constant and drag torque of each motor as a function of said applied currents and measured accelerations.

5. The apparatus of claim 3 wherein, in said learning mode, said control means determines the radii of said web packs on said takeup and supply reels as a function of the ratio between the period of one revolution of said supply motor to the period of one revolution of said takeup motor.

* * * * *